(12) United States Patent
Rosenau et al.

(10) Patent No.: US 11,604,582 B2
(45) Date of Patent: Mar. 14, 2023

(54) METHOD AND SYSTEM FOR CONTROLLING THE USE OF A CARTRIDGE

(71) Applicant: Francotyp-Postalia GmbH, Berlin (DE)

(72) Inventors: Dirk Rosenau, Berlin (DE); Joachim Jauert, Berlin (DE); Andreas Lueneburg, Hohen Neuendorf (DE); Clemens Heinrich, Oranienburg (DE)

(73) Assignee: Francotyp-Postalia GmbH, Berlin (DE)

( * ) Notice: Subject to any disclaimer, the term of this patent is extended or adjusted under 35 U.S.C. 154(b) by 877 days.

(21) Appl. No.: 16/456,726

(22) Filed: Jun. 28, 2019

(65) Prior Publication Data

US 2020/0001636 A1    Jan. 2, 2020

(30) Foreign Application Priority Data

Jun. 28, 2018    (DE) .......................... 102018115555.7

(51) Int. Cl.
*G06F 3/06* (2006.01)
*G07B 17/00* (2006.01)
*B41J 2/175* (2006.01)

(52) U.S. Cl.
CPC .......... *G06F 3/0604* (2013.01); *G06F 3/0655* (2013.01); *G06F 3/0679* (2013.01);
(Continued)

(58) Field of Classification Search
CPC .... G06F 3/0604; G06F 3/0655; G06F 3/0679; G07B 17/00314; G07B 17/00193
(Continued)

(56) References Cited

U.S. PATENT DOCUMENTS 8,959,590 B2    2/2015 Huebler et al.
2018/0007238 A1*    1/2018 Shimahashi .......... H04N 1/6008
(Continued)

FOREIGN PATENT DOCUMENTS

CA    2762821 A1    6/2012
DE    102011012874 A1    7/2012
(Continued)

OTHER PUBLICATIONS

European Search Report dated Nov. 15, 2019, for Application No. 19175613.9.
(Continued)

*Primary Examiner* — Ahshik Kim
(74) *Attorney, Agent, or Firm* — Banner & Witcoff Ltd.

(57) ABSTRACT

A system for printing an imprint on a flat material includes a cartridge holding a consumable (e.g. ink) and at least one material processing device (MPD) (e.g. franking machine) having a printer and a data processor connected to the printer to control use of the cartridge to produce the imprint. The MPD is configured to detect insertion of the cartridge into the printer and generate current consumption information representing the use of the cartridge by the printer since insertion. The cartridge can include a first non-volatile memory that (unchangeably) stores a unique cartridge identification of the cartridge. The data processor is configured to: cause, based on a predeterminable usage-relevant event occurring, a current use-information, generated based on the current consumption information logically linked to the cartridge identification, to be stored in a second memory, and write to an irreversibly writable memory area of the first memory when the event occurs.

17 Claims, 3 Drawing Sheets

(52) U.S. Cl.
CPC . *G07B 17/00193* (2013.01); *G07B 17/00314* (2013.01); *B41J 2/17546* (2013.01); *G07B 2017/00427* (2013.01)

(58) Field of Classification Search
USPC .......................................................... 705/410
See application file for complete search history.

(56) References Cited

U.S. PATENT DOCUMENTS

2019/0303732 A1\* 10/2019 Matsubara ............... B41J 29/13
2021/0302888 A1\* 9/2021 Tanaka ................. G03G 15/556

FOREIGN PATENT DOCUMENTS

| EP | 0825567 B1 | 5/2001 |
| EP | 1132868 A1 | 9/2001 |

OTHER PUBLICATIONS

German Action dated Aug. 9, 2021, Application No. 10 2018 115 555.7, with English language translation attached.
Canadian Office Action for CA Application No. 3048321; dated Sep. 29, 2022.

\* cited by examiner

METHOD AND SYSTEM FOR CONTROLLING THE USE OF A CARTRIDGE

CROSS REFERENCE TO RELATED APPLICATIONS

This patent application claims priority to German Patent Application No. 102018115555.7, filed Jun. 28, 2018, which is incorporated herein by reference in its entirety.

BACKGROUND

Field

The present disclosure relates to a system for printing an imprint on a flat material with a cartridge containing a consumable material, in particular ink, and a material processing device, in particular a franking machine

Related Art

In a variety of applications where a physical reproduction of certain data (e.g. a printout of the data or the like) is generated, consumables are used to generate that physical reproduction which have certain characteristics to ensure a predetermined quality of reproduction and/or, where appropriate, in conjunction with other reproduction characteristics, to prove the authenticity of the reproduced data or the authorization to generate the reproduction. For example, modern franking machines usually use special inks or toners specified by the mail carrier to produce a valid franking imprint. The inks or toners used may also have certain security features (such as fluorescent particles or the like) which are not visible to the human eye without the use of auxiliary means.

In order to ensure that only authorized consumables are used in connection with such reproduction, a number of procedures are known to ensure that only authorized cartridges (such as ink cartridges, ribbon cartridges, toner cartridges, etc.) are released for use in the relevant printing equipment.

Among other things, in a number of processes used locally in the franking machine, such as those described in EP 1 237 725 B1, authorization information stored in a memory of the cartridge is checked in the franking machine, for example, a digital signature of the manufacturer of the cartridge over information specifically assigned to the cartridge is verified. The use of the cartridge is only released if this check is successful. Otherwise, printing will be disabled. Similar processes are described in EP 1 132 868 A1 and EP 0 875 862 A2.

In other procedures, such as those described in EP 1 103 924 B1, a data center compares a code word sent by the franking machine via a communication network with a list of valid code words available in the data center. If this check is not successful, countermeasures can be taken, including blocking the franking machine for using the cartridge. A similar procedure is also described in DE 100 23 145 A1. In another similar procedure described in EP 1 103 925 B1, the franking machine receives a list of valid code words for comparison.

Finally, EP 1 103 925 A1 describes a generic procedure in which the use of an authorized cartridge for a specified number of imprints is stopped in the franking machine even though there is still sufficient residual ink for further use. However, further use of the residual ink is made possible if a corresponding release is made in a release process between the franking machine and a data center in return for corresponding payment by the user in a billing process.

A common feature of all these procedures is that a correspondingly high level of effort is required to ensure that only authorized cartridges are operated in the printer. This results in comparatively high costs for the individual cartridge. In addition, there is sometimes, if at all, only moderate protection against the use of piracy products or formerly authorized cartridges that have been refilled by third parties. Such unauthorized cartridges are typically sold at significantly lower prices than authorized cartridges, so the economic pressure to achieve even stronger protection continues to increase and costs spiral.

The memory of the cartridge described in EP 1 103 925 A1, for example, may record the consumption or the remaining quantity and prevent the cartridge from being used as soon as a certain residual quantity is reached. However, in some cases it is possible to manipulate the memory of the consumption unit.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

Figure 1:
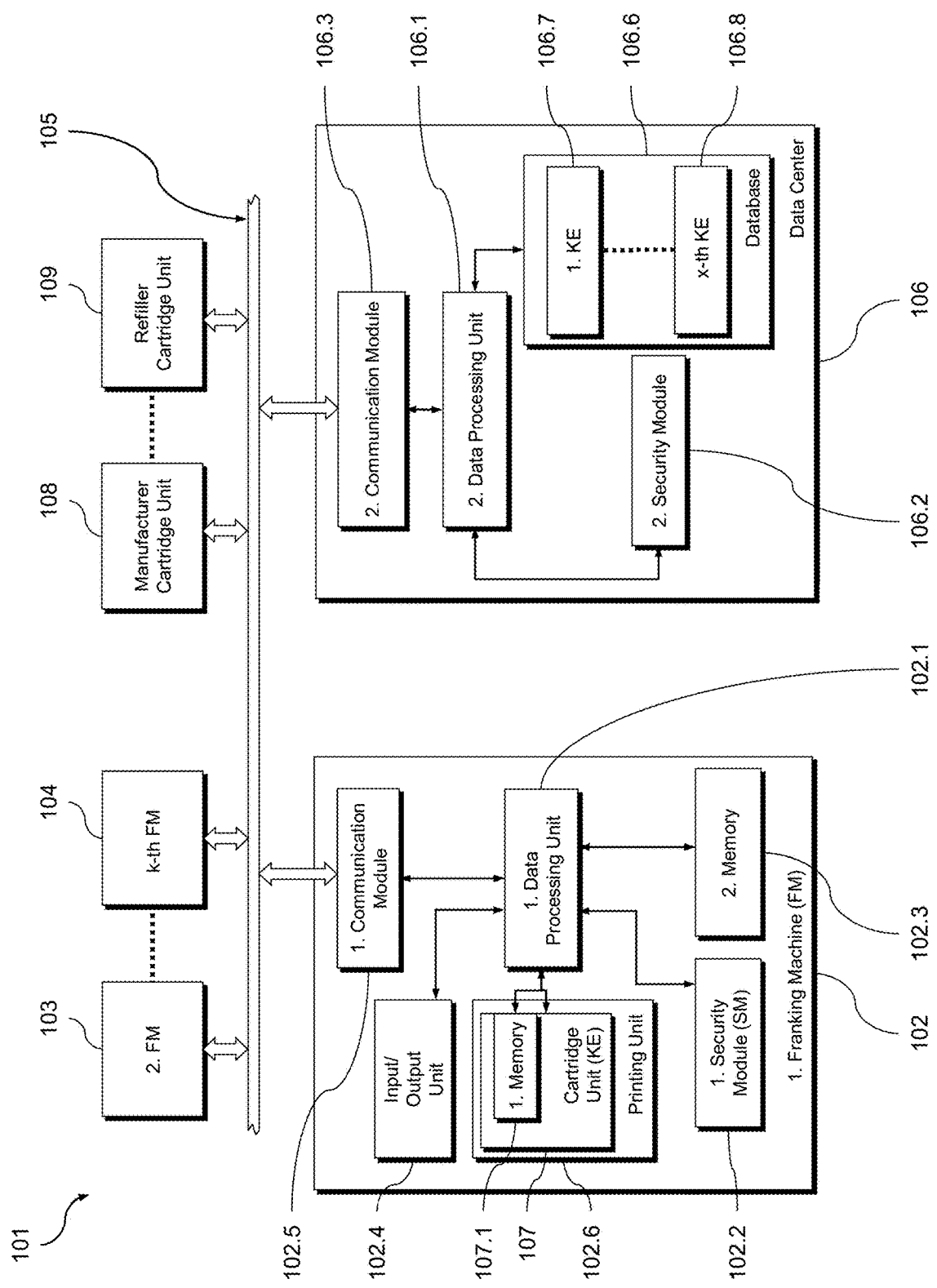
FIG. 1 is a schematic representation of a system according to an exemplary embodiment of the present disclosure.
Figure 2:
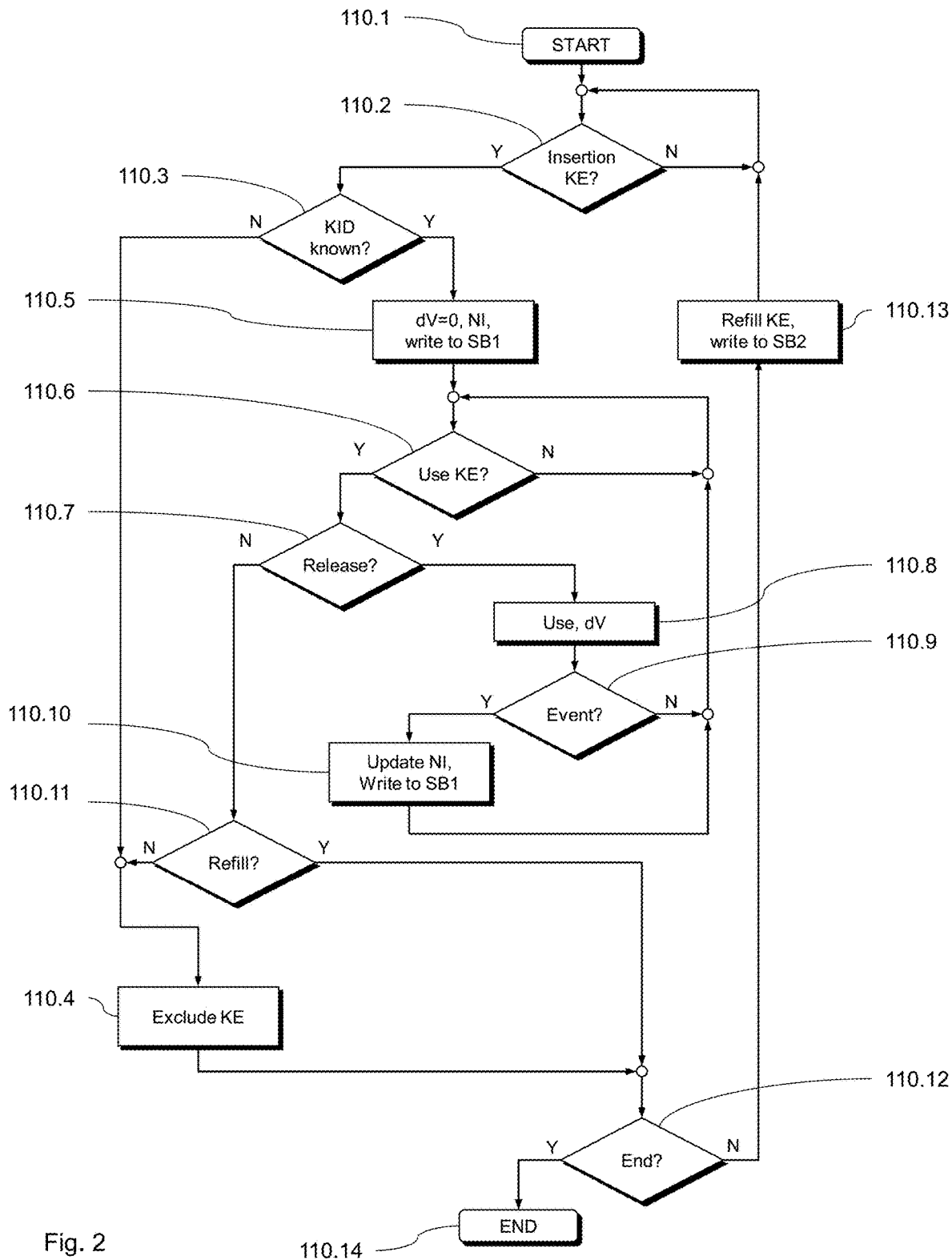
FIG. 2 is a flow chart of a method according to an exemplary embodiment of the present disclosure, which can be carried out with the system shown in FIG. 1.

The exemplary embodiments of the present disclosure will be described with reference to the accompanying drawings. Elements, features and components that are identical, functionally identical and have the same effect are—insofar as is not stated otherwise—respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

The present disclosure relates to a system for printing an imprint on a flat material with a cartridge containing a consumable material, in particular ink, and a material processor, in particular a franking machine. The material processor can include a printer configured to use the cartridge and a first data processor connected to the printer for controlling the use of the cartridge for producing the imprint.

In an exemplary embodiment, the material processor is configured to detect insertion of the cartridge into the printer. The material processor is also configured to generate current consumption information that is representative of the use of the cartridge by the printer since insertion. The cartridge has a first memory in which a unique cartridge identification of the cartridge is stored non-volatilely, in particular unchangeably. The disclosure also concerns a corresponding method for controlling such a system, as well as at least one material processor with a first data processor, and a cartridge of such a system. The at least one material processor shall preferably include franking machines, addressing machines and/or other mail processing equipment.

The present disclosure is therefore based on the objective of providing a system of the kind mentioned at the beginning as well as a method for controlling such a system, a data processor and a cartridge for a material processing device in such a system, which does not or at least to a lesser extent exhibit the disadvantages mentioned above and in particular enables a high level of protection against the use of unauthorized cartridges in a cost-effective manner.

The present disclosure is based on the technical teaching that a simple and cost-effective way of providing a high level of protection against the use of unauthorized cartridges is possible if a data processor maintains the current consumption of the cartridge's printing medium and, at least when events relevant to use occur, initiates the storage of a corresponding current use information logically linked with the cartridge identification in at least a second memory and also writes into an irreversibly writable memory area of the first memory. This combination of a documentation of the use of a cartridge (uniquely identified by the cartridge identification) logically linked with the cartridge identification and the irreversible writing into the memory of the cartridge, makes it possible, among other things, to mark a certain consumption volume as consumed at the beginning of a usage interval (via the irreversible writing action), while at the same time enabling the actual use of the consumption volume marked as consumed by the tracking of consumption clearly assigned to the cartridge.

The irreversible marking of a volume of consumption by means of the first memory ensures in a simple way that even in the event of unauthorized refilling, the refilled volume cannot be used, since it is marked as used via the first memory and the first data processor accordingly only permits the use of any remaining volume.

The storage of the usage information logically linked to the cartridge identification also makes it possible, for example, when the cartridge is reinserted into the printer, to still use any unused part of the consumption volume marked as consumed (according to the state of the first memory). Furthermore, it is possible not only to keep the usage information clearly assigned to the cartridge in the material processing device itself, but also (additionally or alternatively) to transmit it to a remote data center and to keep it there and to make it available to other material processing devices from there. A portion of the consumption volume marked as consumed that has not yet been consumed can also be consumed in these other material processing devices on the basis of this uniquely assigned usage information.

It goes without saying that the consumption volume marked as consumed can in principle be the total usable volume of consumables in the cartridge. Preferably, the consumption volume marked as consumed is only part of the total usable volume of consumables (e.g. ink) of the cartridge. In principle, any suitable subdivision of the total volume into individual consumption volumes can be provided. This subdivision is preferably matched to the number of separately writable memory areas of the first memory. In principle, it can be provided that, if the total volume of the cartridge is consumed once, all memory areas of the first memory unit are also irreversibly written to. Preferably, however, it is provided that the number of memory areas of the first memory is greater than the number of individual consumption volumes into which the total volume of the cartridge is divided. This makes it possible to refill the cartridge, as explained in detail below.

It goes without saying that the current usage information can be designed at will in order to document the current usage of the cartridge. So it can simply be the current consumption information itself. It is also possible, of course, that the current usage information is information about the remaining quantity or volume of print medium in the cartridge based on the current consumption information.

It goes without saying that the usage information can also be supplemented with further information if necessary. For example, it may be provided that the current usage information is provided with a time stamp or the like in order to make the time of its creation and/or memory traceable. It is also possible to logically assign the usage information not only to the cartridge but also to the material processing device (e.g. via a unique material processing device identification), so that, if necessary, consumption volumes marked as consumed via the first memory can only be used by the material processing device in which the marking as consumed took place.

The usage-relevant event can be any event that is relevant for the use of the cartridge by the printer. This could be, for example, the insertion of the cartridge into the printer. It may also be the first use of the cartridge after insertion of the cartridge or the actual consumption of the consumption volume marked as consumed (according to the status of the first memory).

Furthermore, it is understood that all storage processes described above or below may be secured by suitable (sufficiently known) cryptographic means (encryption, hash values, digital signatures, etc.) in order to protect the stored values against undetected manipulation.

The disclosure may, in particular, be based on a cartridge with a print head and a storage container or tank for a consumable. The first memory can then be integrated in the print head. This has the advantage that it is more difficult to manipulate the memory without destroying the print head.

According to one aspect, the present disclosure therefore concerns a system for printing an imprint on a flat material with a cartridge holding a consumable, in particular ink, as well as a material processing device, in particular a franking machine, which comprises a printer designed to use the cartridge and a first data processor connected to the printer for controlling the use of the cartridge for producing the imprint. The material processing device is configured to detect insertion of the cartridge into the printer. Furthermore, the material processing device is configured to generate current consumption information representative of the use of the cartridge by the printer since insertion. The cartridge has a first memory in which a unique cartridge identification of the cartridge is stored non-volatilely, in particular unchangeably. The first data processor is configured to cause, at least when at least one predeterminable usage-relevant event occurs, a storage of a current use-information generated by means of the current consumption information logically linked to the cartridge identification in at least one second memory, the usage-relevant event being relevant for the use of the cartridge by the printer. Finally, the first data processor is configured to write to an irreversibly writable memory area of the first memory when the usage-relevant event occurs.

As already mentioned, the respective usage-relevant event can be any suitable event that is relevant for the use of the cartridge by the printer. These can be any temporal or non-temporal events. For example, the usage-relevant event can be a temporal event, for example, the elapse of a predefinable period of time since the last use of the cartridge. Preferably the at least one usage-relevant event is a first use of the cartridge after insertion into the printer and/or reaching a predeterminable consumption value since insertion and/or reaching a predeterminable consumption value since an immediately preceding usage-relevant event and/or the receipt of a removal command for removing the cartridge from the printer. For all these events, it is advantageous if the associated current consumption information is stored. In addition, it is precisely the time of insertion, the first use after insertion and the achievement of a certain consumption value (e.g. the consumption of a consumption volume mentioned above) after such a usage-relevant event that is appropriate to write to a memory area of the first memory and thus to mark a certain consumption volume as consumed in the first memory in the manner described above before it was actually consumed. It is also possible, of course, that the marking as consumed is only carried out at the end of a usage interval, for example when the cartridge is removed or when the consumption value is reached.

It is understood that in principle it may be provided that the first memory comprises only one single irreversibly writable memory area, which is written to when the usage-relevant event occurs. Preferably, however, it is provided that the first memory has a plurality of N irreversibly writable memory areas. The first data processor is then configured to write to the memory areas in a sequence, in particular a sequence that can be predefined, when events relevant to use occur. The sequence can be defined logically and/or physically (by the structure of the first memory). This makes it easy to subdivide the total volume available when the cartridge is filled into individual consumption volumes as finely and appropriately as desired and to mark their consumption in a way that is easy to trace.

The number of irreversibly writable memory areas of the first memory can be chosen arbitrarily. Preferably, the first memory comprises a plurality of $N=10$ to 100, preferably $N=15$ to 50, more preferably $N=20$ to 30, irreversibly writable memory areas. This allows a good subdivision of the total volume of printing medium in the cartridge at a reasonable cost.

In addition or alternatively, the first memory may be physically and/or logically divided into a plurality of M memory area groups, each with several irreversibly writable memory areas. This makes it easy to make the cartridge refillable by assigning a memory area group to each filling (i.e. a total volume available after complete filling), the memory areas of which are then irreversibly written to after consumption of this total volume. After refilling, a further memory area group can then be used to document the consumption of the replenished total volume, as described in more detail below in connection with preferred variants.

Here, too, the number of memory area groups of the first memory and/or the number of individual memory areas of such a memory area group can be selected arbitrarily. Preferably the first memory comprises a plurality of $M=2$ to 20, preferably $M=3$ to 10, more preferably $M=5$ to 8, memory area groups. Each memory area group preferably comprises $Z=2$ to 20, preferably $Z=3$ to 10, further preferably $Z=4$ to 8, memory areas. This allows a sufficiently fine division of the first memory or the individual memory area groups with a simple limitation of the number of refills of the cartridge.

It further goes without saying that the individual irreversibly writable memory area can in principle be of any suitable size. In particular, it can comprise several bits that may be set in a particular sequence or pattern when writing. Preferably at least one irreversibly writable memory area of the first memory, in particular each irreversibly writable memory area of the first memory, has at least one bit, in particular exactly one bit. This allows a particularly cost-effective and compact configuration to be achieved.

In preferred variants, at least some of the memory areas are combined physically and/or logically to form a memory area group which has at least one first memory area and at least one second memory area. The data processor is then configured to write to a first memory area when a usage-relevant event occurs and block use of the cartridge by the printer when all first memory areas of the memory area group are written to and the at least one second memory area of the memory area group is not written to. This makes it possible in a simple manner, for example, to use the second memory area to indicate that a total available volume of the cartridge has been used up and that no authorized refilling has yet been carried out. Here it is understood that, as explained above, when writing to the first memory area at the beginning of the usage interval (i.e. at the beginning of the usage of the assigned consumption volume) via the current usage information, an actual consumption of the consumption volume which is assigned to the last first memory area of the memory area group is of course still possible.

Furthermore, it can be provided that only when the at least one second memory area has been written to, can the use of a further memory area group be switched over to, which is then also written to with the consumption step by step (or first memory area by first memory area) in order to document the consumption of the refilled printing medium.

In principle, it may be provided that the at least one second memory area can also be written to by the first data processor of the material processing device. Appropriate measures can be taken to ensure that the writing only takes place if an appropriate authorization is available. Preferably, the first data processor and/or the at least one second memory area is configured such that the at least one second memory area is not writable by the first data processor. This makes it easy to ensure that only an authorized filler of the cartridge can release it for a further usage cycle by writing to at least one second memory area.

In further preferred variants, at least a first part of the memory areas is physically and/or logically combined to form a first memory area group and at least a second part of the memory areas is physically and/or logically combined to form a second memory area group, the respective memory area group having at least one first memory area and at least one second memory area. The first data processor is configured to release further use of the cartridge by the printer when all first and second memory areas of the first memory area group are written to and the second memory area group comprises at least one unwritten first memory area. In particular, this allows the transition described above to the use of the second memory area group after the cartridge has been replenished by an authorized refill. The first data processor is then preferably configured to write to a first memory area of the second memory area group after the first detection of a written-to second memory area of the first memory area group when a usage-relevant event occurs, i.e. to switch to the use of the second memory area group.

In certain variants it can be provided that at least some of the memory areas are physically and/or logically combined to form at least one memory area group which has at least one first memory area and at least one second memory area, the memory areas being configured such that a first memory area can be written to by the first data processor and a second memory area can be written to only by an authorized refiller of the cartridge and not by the first data processor. This also makes it easy to ensure that only authorized refilled cartridges can be used.

For certain advantageous variants, the data processor is configured to write to one of the memory areas when the cartridge is used for the first time after insertion and/or when a predefinable consumption value is reached. Further, the first data processor is configured to cause storage of a (possibly unique) memory area identification of the written-to memory area logically associated with the cartridge identification in the at least one second memory. This allows documentation of the memory areas written to in the second memory, which can then be used in a suitable manner. In particular, it is possible that the data processor is configured to cause storage of the memory area identification of the written-to memory area logically linked to a unique material processing device identification of the material processing device. In this case, the memory area or the consumption volume assigned to it can be assigned to the material processing device. With this it is possible to reserve this consumption volume assigned to the memory area for the respective material processing device and to release its consumption subsequently only by the assigned material processing device. A consumption of such a reserved consumption volume can then be blocked in another printer.

In certain variants, the first data processor may be configured to logically assign consumption quantity information to the written-to memory area, which is representative of a consumption quantity of consumable goods, for example ink or another consumable good (toner, etc.), of the cartridge assigned to the described memory area, and to release a use of the cartridge depending on the consumption quantity information and the current consumption information until the consumption quantity assigned to the described memory area is reached. This allows an advantageous allocation of a written-to memory area of the first memory to a certain pre-defined consumption volume.

It goes without saying that the at least one second memory can always be allocated to any suitable component of the arrangement. In certain variants, at least one second memory may be a memory of the material processing device itself. Thus, as described above, the storage of the current usage information logically assigned to the cartridge can take place directly in the material processing device.

In addition, or alternatively, the at least one second memory may also be a memory of a data center remote from the material processing apparatus, which can be connected to the first data processor via a communications network (i.e. two second memories may be present if necessary, one in the material processing device and one in the data center). In this case, the first data processor may be configured to transmit the current usage information in combination with the cartridge identification and a unique material processing device identification of the material processing equipment to the remote data center. This can then be used to assign the use of the cartridge to a specific material processing device as described above.

As already mentioned, the current usage information can simply correspond to the current consumption information. Alternatively, the current usage information can be residual quantity information that is representative of the remaining residual quantity of consumable (e.g. ink) of the cartridge and was determined using the current consumption information. In both cases, meaningful information can be obtained which can then be used in an advantageous manner.

For certain variants it can be provided that the at least one second memory only contains the last current usage information together with the corresponding cartridge identification. Preferably, the at least one second memory is configured to store a plurality of cartridge data sets, each cartridge data set comprising at least one usage information and one cartridge identification for a cartridge. This makes it possible to store cartridge data sets for different cartridges used in the system. In particular, it is possible that the cartridge data set includes at least one unique material processing device identification of the material processing device assigned to the usage information, from which the current usage information originates. This makes it possible to assign the use of individual cartridges to individual material processing devices as described above.

In certain variants, it may be provided that the first data processor is configured to interrogate, triggered by insertion of the cartridge into the material processing apparatus and using the cartridge identification, from a remote data center a stored residual quantity information associated with the cartridge which is representative of a remaining residual quantity of consumable of the cartridge. In this case, the first data processor may then be configured to release use of the cartridge depending on the residual quantity information received and the current consumption information until a predefinable minimum residual quantity is reached. In other words, this makes it possible in an advantageous way to track the consumption from the cartridge, if necessary also via its use in several material processing devices, and to release the use of the remaining quantity accordingly.

In particular, it can be provided here that the data processor is configured to determine, at least when the at least one usage-relevant event occurs, an updated residual quantity information using the received residual quantity information and the current consumption information and to transmit the current usage information to the remote data center. This means that the residual quantity information can be updated in the remote data center in an advantageous way at certain times or when certain events occur.

In certain particularly advantageous variants, it may be provided that the first data processor is configured to release use of the cartridge only until a standard consumption is reached after insertion of the cartridge into the material processing apparatus unless the retrieved stored residual quantity information is received from the remote data center. This makes it possible in an advantageous way to initially release the cartridge for use even without a direct connection to the data center, thus avoiding delays in use on the one hand and preventing unauthorized excessive use on the other. It is preferably provided that the standard consumption corresponds at most to the minimum residual quantity, preferably smaller than the minimum residual quantity. Thus, complete emptying of the cartridge can be easily and reliably avoided.

In certain variants of the arrangement, a data center is provided remote from the material processing device that can be connected to the data processor via a communication network and that comprises the at least one second memory. In particular, it may be provided here that the data center and the first data processor are configured to access, using the cartridge identification, the usage information logically assigned to the cartridge from the at least one second memory in order to release the use of the cartridge by the material processing device. This is a simple way to prevent unauthorized use or excessive use of the cartridge.

The present disclosure also concerns a data processor which is designed as the first data processor of the system in accordance with the disclosure. It also concerns a data processor which is designed as the data center of the system in accordance with the disclosure and which comprises the at least one second memory. Furthermore, the present disclosure relates to a cartridge which is designed as the cartridge of the system in accordance with the disclosure, the first memory of the cartridge, in particular, having a plurality of N irreversibly writable memory areas. This allows the advantages and variants described above in connection with the system conforming to the disclosure to be realized to the same extent, so that in order to avoid repetitions reference is made in this respect to the explanations given above.

The present disclosure also concerns a method for controlling a system for printing an imprint on a flat product, the system comprising a cartridge holding a consumable, in particular ink, and a material processing apparatus, in particular a franking machine, comprising a printer adapted to use the cartridge, and a first data processor connected to the printer for controlling the use of the cartridge for printing the imprint. Here, the material processing device detects the insertion of the cartridge into the printer. Furthermore, the material processing device generates current consumption information which is representative of the use of the cartridge by the printer since it was inserted. The first memory of the cartridge contains a non-volatile, in particular unchangeable, unique cartridge identification of the cartridge. The first data processor, at least when at least one predeterminable usage-relevant event occurs, causes a storage of a current use-information generated by means of the current consumption information, logically linked to the cartridge identification in at least one second memory, wherein the usage-relevant event is relevant for the use of the cartridge by the printer. Finally, the first data processor writes to an irreversibly writable memory area of the first memory when the usage-relevant event occurs. Here, too, the advantages and variants described above in connection with the inventive system can be realized to the same extent, so that reference is made to the above remarks to avoid repetitions.

In the following, with reference to FIGS. 1, 2 and 3A to 3F (to which reference is also made jointly as FIG. 3 below), a preferred embodiment of the system 101 according to the disclosure is given, with which a preferred variant of the method according to the disclosure is carried out.

As shown in FIG. 1, the System 101 comprises a number of k material processing machines in the form of franking machines (FM), which include, inter alia, a first franking machine 102, a second franking machine 103 and a k-th franking machine 104. The franking machines 102 to 104 can each be connected to a remote data center 106 via a communication link, e.g. a data network 105 (e.g. the Internet).

The franking machine 102 comprises, inter alia, a first data processor in the form of a first processor 102.1, a first security module 102.2, a second memory 102.3, an input/output unit 102.4, a communication module 102.5 and a consumption device in the form of a printer 102.6, which are each connected to the first processor 102.1.

The printer 102.6 is used in a conventional way to generate a franking imprint for a mail item under the control by the processor 102.1. To this end, in addition to a printhead controller (not described in detail) connected to the processor 102.1, it includes a printhead controlled by the printhead controller. In this case, the print head is part of a cartridge (KE) in the form of an ink cartridge 107 inserted in the printer 102.6. It is understood, however, that in other variants any other printing technology or any other consumable (ink ribbon, toner, etc.) can be used instead of ink.

The ink cartridge 107 holds in a tank the consumable, preferably an ink specified by the carrier of the postal items, which is used to generate the franking imprints. The ink can be characterized by a special color (e.g. the postal blue of the Deutsche Post AG) but also by other so-called security features (e.g. fluorescent particles or the like).

It goes without saying that with other variants of the disclosure it may also be provided that the print head is designed as an integral part of the printer and that only the consumables (e.g. ink, toner, ink ribbon, etc.) are held in the cartridge (KE).

The ink cartridge 107 also includes a first memory 107.1, which is connected to the first processor 102.1 via a corresponding contacting unit when the ink cartridge 107 is fully inserted into the printer 102.6. The first memory 107.1 and/or the contacting unit can be attached to the ink cartridge 107 in such a way that the print head of the ink cartridge 107 can no longer be correctly controlled if the first memory 107.1 has been physically manipulated, e.g. removed and reattached or replaced by another memory. In particular, the first memory 107.1 may be an integral part of the unit which also forms the nozzles of the printhead. However, such a security mechanism may also be missing in other variants of the disclosure.

The first security module 102.2 is normally used to provide the security-relevant postal services required for franking, such as the secure accounting for franking values and the cryptographic protection of certain postal data. Furthermore, the first security module 102.2 enables cryptographic operations to be carried out for the purpose of securing further data, securing communication via the data network and decrypting and verifying received cryptographically secured data.

For performing cryptographic operations, in particular the secure accounting for franking values, the first security module 102.2 comprises, in a sufficiently known manner, a processor, a cryptography module for performing cryptographic operations (using cryptographic algorithms and parameters) and corresponding (possibly redundant) registers for storing the accounting data, which registers are arranged in a physically and logically secured area protected from unauthorized access.

The data center 106 comprises a second data processor 106.1, a second security module 106.2, a communication module 106.3, a first database 106.4, a second database 106.5, and a third database 106.6, each connected to the second processor 106.1. The second security module 106.2 provides security relevant services such as cryptographic protection, decryption and verification of certain postal or non-postal data or the protection of communication via the data network 105.

The data center 106 can also be connected via the data network 105 to a number of n remote data centers of manufacturers or authorized fillers of cartridges (KE), i.e. ink cartridges 107. This includes, among other things, a first data center 108 of a manufacturer and a data center 109 of an authorized filler.

As will be explained below using the first franking machine 102 (representative of all other franking machines), the arrangement 101 can be used to execute, for the first franking machine 102, a method for controlling the printing of an imprint on a flat product according to the disclosure using the ink cartridge 107 in the printer 102.6 of the first franking machine 102.

First, in step 110.1, the process sequence of the method according to the disclosure is started. In a step 110.2, the first processor 102.1 then checks whether an ink cartridge 107 has been inserted into the printer 102.6.

If this is the case, the processor 102.1 checks in a step 110.3 whether it is a known ink cartridge 107. For this purpose, the processor reads from the first memory 107.1 a unique cartridge identification KID, which was irreversibly stored in the first memory 107.1 (in a sufficiently well-known manner). The read-out cartridge identification KID is compared with a plurality of cartridge data sets KDS, which are stored in the second memory 102.3 of the franking machines 102. Each cartridge data set KDS, for known ink cartridges 107, contains their unique cartridge identification KID, a last recorded current consumption dV and a current usage information NI in the form of a residual quantity information representative of the last available residual quantity of ink in the ink cartridge 107.

In this example, the cartridge data set KDS can also include a unique material processing device identification assigned to the franking machine 102 in the form of a franking machine identification FMID, which shows that the ink cartridge 107 has already been inserted into the franking machines 102 once before. It goes without saying that, for certain variants, the cartridge data set KDS can include several franking machine identifications if the ink cartridge 107 had already been used in several different franking machines before. It also goes without saying that, with other variants of the cartridge data set KDS, such franking machine identification FMID can also be completely absent.

In this example, the KDS cartridge data set is protected against undetected manipulation in a sufficiently well-known manner (e.g. by one of the security modules 102.2, 106.2), e.g. by a digital signature. It goes without saying, however, that such a safety mechanism may also be missing in other variants.

The cartridge data set KDS may have been generated in this example when the 107 ink cartridge was inserted into the 102 franking machine for the first time. In this case, the franking machines 102 can establish communication with the data center 107 via the network 105 in order to interrogate corresponding data (cartridge identification KID, usage information NI) from the data center 106 which are stored in a database 106.6 of the data center 106 which then represents a further second memory in the sense of the present disclosure. The data of the database 106.6 can originate from the data centers 108 and 109 of the manufacturer or filler of the ink cartridge 107, respectively. For example, a manufacturer can transmit an initial cartridge data set KDS for a newly manufactured 107 ink cartridge to the 106 data center using a 108 data center. The same applies to an authorized filler of the ink cartridge 107 who, after filling, transmits an updated cartridge data set KDS from his data center 109 to the data center 106.

If the second memory 102.3 of the franking machine 102 does not contain a cartridge data set KDS corresponding to the cartridge identification KID of the ink cartridge 107 of the ink cartridge 107, the franking machine 102 in step 110.3 continues to query the data center 106 using the cartridge identification KID in order to obtain the associated cartridge data set KDS.

If this request fails, i.e. if no corresponding cartridge data set KDS can be localized in the data center 106 either, the ink cartridge 107 is excluded from use in a step 110.4.

If however an associated cartridge data set KDS is found in step 110.3, the processor 102.1 of the franking machine 102 sets the current consumption value dV=0 in step 110.5, loads the current usage information NI from the cartridge data set KDS and writes an irreversibly writable first memory area 111.1 of the first memory 107.1 (see FIG. 3).

In a step 110.6, the processor 102.1 then checks whether the ink cartridge 107 should be used. This can be a print job to create an imprint. However, it can also be a cleaning process of the ink cartridge 107, which also consumes ink from the ink cartridge.

If such use is to occur, the processor 102.1 checks in a step 110.7 whether there is a release for the use of the ink cartridge 107, as described in more detail below. If a release is available, the ink cartridge 107 is used in step 110.8. The current consumption information dV is increased by a value corresponding to the actual ink consumption.

In a subsequent step 110.9, it is then checked whether a usage-relevant event NRE is present, as will also be described in more detail below. If this is not the case, the system jumps back to step 110.6. Otherwise, the processor 102.1 updates the current usage information dV (i.e. the currently available remaining amount of ink in the ink cartridge 107) in a step 110.10 using the current consumption information dV and stores this in the associated cartridge data set KDS in the second memory 102.3 of the franking machine 102. It may be provided that, triggered by this storage, the cartridge data set KDS is also transmitted (immediately or at a later time) to the data center 106 in order to update the corresponding entry 106.7 in the database 106.6 there. It goes without saying that, in certain variants, it may also be provided that the cartridge data set KDS is not stored in the second memory 102.3 but exclusively in the database 106.6 of the data center 106.

It goes without saying that it may be provided that the cartridge data set KDS only contains the most current or last usage information NI, which may be provided with a time stamp TS (e.g. from the security module 102.2). However, it is also possible that the cartridge data set KDS includes a history of the usage information NI, which is then stored in a corresponding sequence and/or linked with corresponding temporal information (e.g. a time stamp).

If it is determined in step 110.7 that there is no clearance to use cartridge 107 step 110.11 checks whether filling of ink cartridge 107 is necessary. If this is the case, step 110.12 first checks whether the procedure is to end. If this is not the case, a jump is made to step 110.13, in which the ink cartridge 107 is designated for refilling. The user can then send the ink cartridge 107 to the filler, which then after filling and by means of the data center 109 transmits an updated cartridge data set KDS to the data center 106 which then enters it in the database 106.6.

If it is determined in step 110.12 that the procedure is to be terminated, it ends in step 114.

The system 101 described above can be used to implement the variants described above. Thus it is possible with the system 101 to realize a high level of protection against the use of unauthorized ink cartridges 107 in a simple and cost-effective way by the processor 102.1 tracking the current ink consumption of the ink cartridge 107 used and, when usage-relevant events occur, on the one hand storing a corresponding current usage information NI logically linked with the cartridge identification KID in the second memory 102.3 and/or the database 106.6 (as further second memory) in the form of the cartridge data set KDS and on the other hand writing to an irreversibly writable memory area 111.1 of the first memory 107.1.

This combination of a logically linked documentation of the use of the ink cartridge 107 with the cartridge identification and the irreversible writing of the memory 107.1 of the ink cartridge 107 in an advantageous way makes it possible, among other things, to set a certain consumption volume VV (via the irreversible writing of the memory area 111.1) to be marked as used, but at the same time to enable the actual use of the consumption volume VV marked as used by the franking machine 102 by tracking the current consumption dV clearly assigned to the ink cartridge 107.

The irreversible marking of a consumption volume VV by writing to a first memory area 111.1 ensures in a simple way that the refilled volume cannot be used in the event of unauthorized refilling, since it is marked as consumed via the first memory 107.1 and the processor 102.1 accordingly only permits the use of any remaining volume.

The storage of the current usage information NI logically linked with the cartridge identification KID makes it possible, on the one hand (e.g. when the ink cartridge 107 is inserted again into the printer 102.6), to still use a possibly not yet used part of the consumption volume VV marked as used (according to the state of the first memory 111.1).

It is also possible to keep the current usage information NI clearly assigned to the ink cartridge 107 not only in the franking machine itself, but also, if necessary, to transmit it additionally or alternatively to the data center 106 and keep it there, and from there to make it available to other franking machines 103, 104. An unused portion of the consumption volume VV marked as consumed can also be consumed in these other franking machines 103, 104 on the basis of this clearly assigned usage information NI of the cartridge data set KDS, if the ink cartridge 107 is used there.

As described above, the consumption volume VV marked as consumed can basically be the total usable ink volume of the ink cartridge 107. In the present example, the consumption volume VV marked as consumed is only part of the total usable volume GV of ink in the ink cartridge 107. In principle, any suitable subdivision of the total ink volume GV into individual consumption volumes VV can be provided. This subdivision is preferably matched to the number of separately irreversibly recordable memory areas 111.1 of the first memory area 107.1. In principle, it can be provided that if the total volume GV of the ink cartridge 107 is consumed once, all first memory areas 111.1 of the first memory 107.1 are also irreversibly written to. A refilling and subsequent use of the ink cartridge 107 is then no longer possible.

However, it is preferable that, as in the present example, the number of memory areas 111.1 of the first memory 107.1 is greater than the number of individual consumption volumes VV, into which the total volume GV of the ink cartridge 107 is divided. This makes it possible to refill the ink cartridge 107 and use it again in franking machines 102, 103, 104.

It goes without saying that the current usage information NI can be designed in any way to document the current usage of the ink cartridge 107. So it can simply be the current consumption information dV itself. It is also possible, of course, that the current usage information NI (as described above), based on the current consumption information dV, is information about the remaining quantity of ink in the ink cartridge 107 or a remaining volume RV of ink in the ink cartridge 107 still remaining for use.

It goes without saying that the usage information NI can also be supplemented with further information if necessary. For example, as described above, it can be provided that the current usage information NI is provided with a time stamp TS or the like in order to make the time of its creation and/or storage traceable. It is also possible, as described above, to logically assign the usage information NI not only to the ink cartridge 107 but also to the franking machine 102, 103, 104 (for example via its unique franking machine identification FMID), so that, if necessary, via the first memory 107.1 (more precisely its memory areas 111.1), consumption volumes VV marked as consumed can also only be used by the franking machine 102, 103, 104 in which the marking as consumed was carried out.

The usage-relevant event NRE, which is recorded in step 110.9, can be any temporal or non-temporal events that are relevant for the use of the ink cartridge 107 by the franking machine 102. For example, the usage-relevant event NRE can be a temporal event, such as the elapse of a pre-definable time period dT since the last use of the ink cartridge 107. It can also be the insertion of the ink cartridge 107 into the printer 102.6. It may also be the first use of ink cartridge 107 after inserting ink cartridge 107 into printer 102.6 or the actual consumption of the consumption volume VV marked as consumed (according to the state of the first memory area 111.1). In particular, this may involve the reaching of a pre-defined consumption value since an immediately preceding usage-relevant event NRE. The NRE event may also be the input of a removal command to remove the ink cartridge 107 from the 102.6 printer.

For all these events NRE it is advantageous if the corresponding current consumption information dV is stored, for example in the cartridge data set KDS. In addition, it is precisely the insertion, the first use after insertion and the achievement of a certain consumption value (e.g. the consumption of a consumption volume VV mentioned above) after such a usage-relevant event a suitable point in time for writing to a memory area 111.1 of the first memory 107.1 and thus marking a certain consumption volume VV as consumed in the first memory 107.1 in the manner described above before it was actually consumed.

Of course, it is also possible that this marking as consumed is not made until the end of a usage interval NINT, for example when removing the ink cartridge 107 or when reaching the consumption value dV=VV.

As shown in FIG. 3, the first memory 107.1 has a plurality of N irreversibly writable memory areas 111.1, 111.2. The processor 102.1 writes to the memory areas 111.1, 111.2 in the event of usage-relevant events NRE in a predefinable sequence. The sequence can be specified logically and/or physically (by the structure of the first memory 107.1). This makes it easily possible to subdivide the total volume GV available with a filling of the ink cartridge 107 into individual consumption volumes VV in an arbitrarily granular and suitable manner and to mark their consumption in a way that is easy to trace.

The number of irreversibly writable memory areas 111.1, 111.2 of the first memory can in principle be selected arbitrarily. The first memory preferably comprises a plurality of N=10 to 100, preferably N=15 to 50, more preferably N=20 to 30, irreversibly writable memory areas 111.1, 111.2. By this means, a good subdivision of the total volume GV of printing medium of the ink cartridge 107 can be achieved with reasonable effort.

As can be seen in FIG. 3, the first memory 107.1 in the present example is physically and/or logically divided into a plurality of M memory area groups 111.3, each with several irreversibly writable memory areas 111.1, 111.2. FIG. 3A shows a new state with first memory areas 111.1, 111.2 which have not yet been irreversibly written to. This makes it easy to make the ink cartridge 107 refillable by assigning a memory area group 111.3 to each filling (i.e. a total volume GV available after complete filling), the first memory areas 111.1 of which are then written to after consumption of this total volume GV. After refilling, another memory area group 111.3 can then be used to document the consumption of the total volume GV refilled, as described in more detail below.

Here too, the number of memory area groups 111.3 of the first memory and/or the number of individual memory areas 111.1, 111.2 of such a memory area group 111.3 can be selected arbitrarily. Preferably, the first memory 107.1 comprises a plurality of M=2 to 20, preferably M=3 to 10, more preferably M=5 to 8, memory area groups 111.3. Each memory area group 111.3 preferably comprises Z=2 to 20, preferably Z=3 to 10, more preferably Z=4 to 8, memory areas 111.1, 111.2. Hereby a sufficiently fine subdivision of the first memory 107.1 or the individual memory area groups 111.3 is possible with a simple limitation of the number of possible authorized refills of the ink cartridge 107.

As described above, the individual irreversibly writable memory areas 111.1, 111.2 can basically have any suitable size. In particular, it can comprise several bits that may be set when writing in a particular sequence or pattern. In this example, each irreversibly writable memory area 111.1, 111.2 of the first memory 107.1 has exactly one bit. This provides a particularly cost-effective and compact configuration that can be easily integrated into an existing electronic component of the 107 ink cartridge.

Figure 3A:
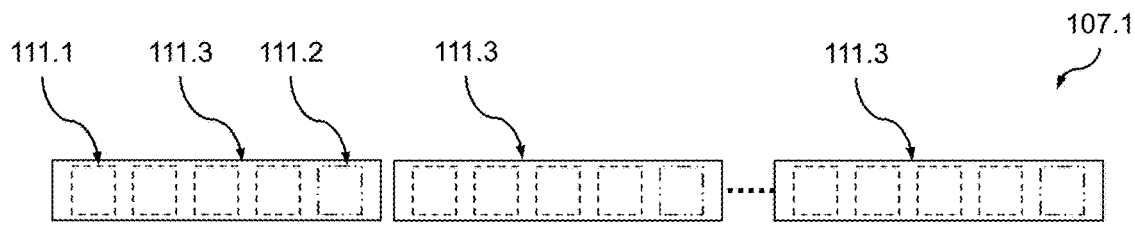
FIGS. 3A-3F illustrate individual states of the first memory, according to exemplary embodiments, of the cartridge of FIG. 1.
Figure 3B:
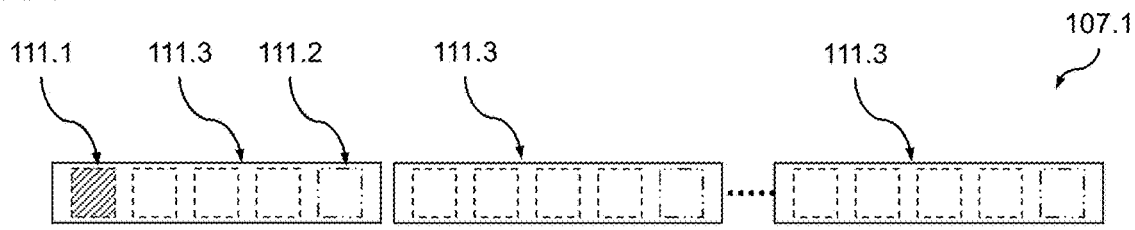

In the present example, the respective memory area group 111.3 comprises several (here four) first memory areas 111.1 and a second memory area 111.2. The processor 102.1 writes to a new first memory area 111.1 each time a usage-relevant event NRE occurs (FIG. 3B shows a state after a first memory area 111.1 has been written to).

Figure 3C:
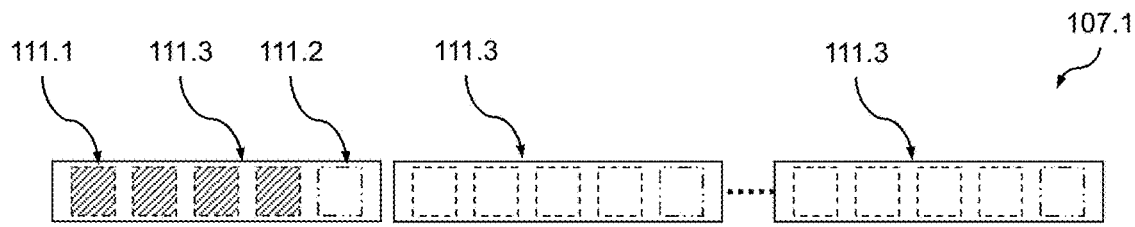

The processor 102.1 blocks the use of the ink cartridge 107 in step 110.7 if all first memory areas 111.1 of the current memory area group 111.3 to be written to are written to, but the second memory area 111.2 of the memory area group 111.3 is not written to (see FIG. 3C). This makes it possible, for example, to easily indicate via the second memory area 111.2 that a total available volume GV of the ink cartridge 107 has been used up and no authorized refilling has yet been carried out. Here it is understood that, as explained above, when writing to the first memory area 111.1 at the beginning of the usage interval NINT (i.e. at the beginning of the usage of the assigned consumption volume VV), via the current usage information NI, an actual usage of the consumption volume VV, which is assigned to the last written-to first memory area 111.1 of the memory area group 111.3, is of course still possible.

Furthermore, the present example provides that only when the second memory area 111.2 of one memory area group 111.3 is written to, can a further memory area group 111.3 be used, which is then also written to with the consumption step by step (or first memory area 111.1 by first memory area 111.1) in order to document the consumption of the refilled ink.

Here it can basically be provided that also the second memory area 111.2 can be written to by the processor 102.1. Appropriate measures can be taken to ensure that the writing only takes place if an appropriate authorization is available.

Preferably, the processor 102.1 and/or the second memory area 111.2 is configured such that the second memory area 111.2 is not writable to by the processor 102.1. This makes it easy to ensure that only an authorized filler of the ink cartridge 107 can release it for a further usage cycle by writing to the second memory area 111.2 of the last memory area group 111.3 written to.

Figure 3D:
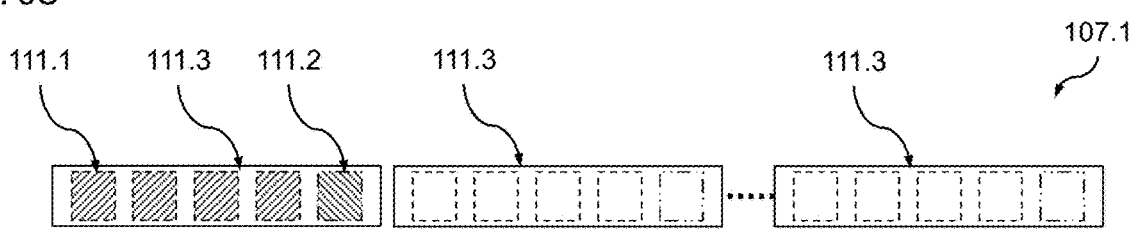
Figure 3E:
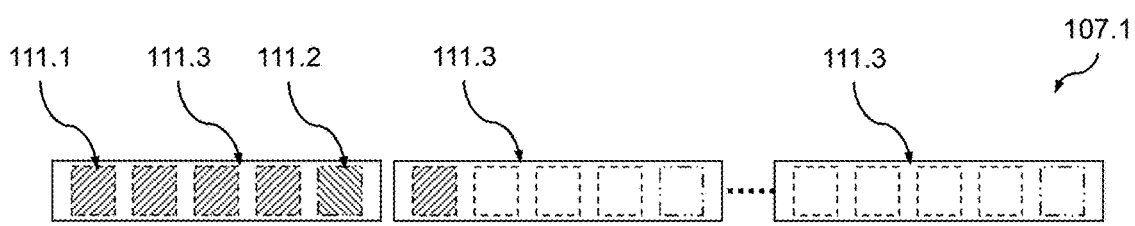
Figure 3F:
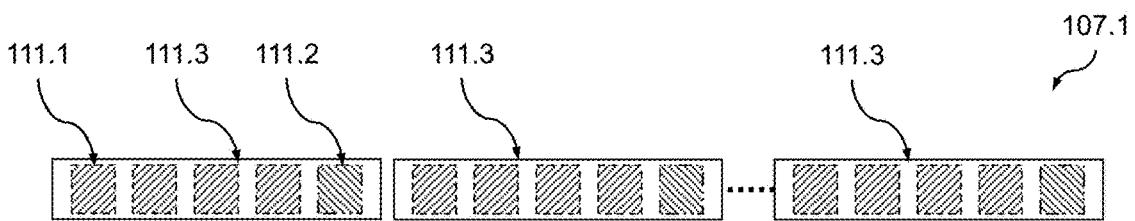

In the present example, the processor 102.1 in step 110.7 releases further use of the ink cartridge 107 if all first and second memory areas 111.1, 111.2 of the first memory area group 111.3 are written to and a subsequent second memory area group 111.3 has at least one unwritten first memory area 111.1 (see FIG. 3D). In particular, this allows the transition described above to use the second memory area group 111.1 after authorized refilling of the ink cartridge 107. The processor 102.1, after the first detection of a written-to second memory area 111.2 of the first memory area group 111.3, then writes to a first memory area 111.1 of the following second memory area group 111.3 when a usage-relevant event NRE occurs, i.e. switches to the use of the second memory area group 111.3 (see FIG. 3E). If all memory areas 111.1, 111.2 of all memory area groups 111.3 are written to (see FIG. 3F), the useful life of ink cartridge 107 ends and it can no longer be used in one of the franking machines 102, 103, 104.

In certain advantageous variants, the processor 102.1 writes to one of the memory areas 111.1 when the ink cartridge 107 is used for the first time after insertion and/or when a predeterminable consumption value dV is reached. The processor 102.1 initiates the storage of a (possibly unique) memory area identification SBID of the written-to memory area 111.1 logically linked with the cartridge identification KID in the second memory 102.3 and/or the database 106.6, for example in the cartridge data set KDS.

This achieves a documentation of the memory areas 111.1 written to in the second memory 102.3 or the database 106.6. This also makes it possible, for example, for the processor 102.1 to store the memory area identification SBID of the memory area 111.1 described logically linked to the franking machine identification FMID of the franking machine 102 in the cartridge data set KDS. In this case, the memory area 111.1 or the consumption volume VV assigned to it can in turn be assigned to the franking machines 102. This makes it possible to reserve this consumption volume VV assigned to the memory area for the relevant franking machine 102 and then only release its consumption in the assigned franking machine 102. A consumption of such a reserved consumption volume VV can then be blocked in another franking machine 103, 104.

In particular, it is then provided here that consumption quantity information VMI which is representative of a previous consumption quantity assigned to the written-to memory area is logically assigned to the written-to memory area 111.1, and to release use of the ink cartridge 107 as a function of the consumption quantity information VMI and the current consumption information dV until the consumption quantity or consumption volume VV assigned to the written-to memory area is reached. This allows an advantageous allocation of a written-to memory area 111.1 to a certain pre-defined consumption volume VV.

As described, the processor 102, triggered by an insertion of the ink cartridge 107 into the material processing device and using the cartridge identification KID, can interrogate from a remote data center stored residual amount information associated with the ink cartridge 107 in the form of the usage information NI representative of a remaining residual amount of ink in the ink cartridge 107. In this case, the processor 102.1 can then release the use of the ink cartridge 107 depending on the received residual quantity information RMI (e.g. in the form of the usage information NI) and the current consumption information dV until a pre-settable minimum residual quantity RMM is reached. In other words, it is advantageously possible to track the consumption of the ink cartridge 107, if necessary also across its use in several franking machines 102, 103, 104, and to release the use of the remaining quantity RM remaining accordingly.

In particular, it may be provided that the processor 102.1 determines an updated residual quantity information RMI using the received residual quantity information RMI and the current consumption information dV at certain times or at least when the at least one usage-relevant event NRE occurs and transmits the current usage information NI to the data center 106 as the current usage information. This means that the residual quantity information RMI or the usage information NI can be updated in the remote data center 106 in an advantageous way at certain times or when certain events NRE occur.

For certain particularly advantageous variants, it may be provided that, after inserting the ink cartridge 107 in step 110.7, the processor 102.1 only releases the use of the ink cartridge 107 until a standard consumption SVV is reached unless the stored residual quantity information RMI is received from the remote data center. This makes it possible in an advantageous way to initially release the ink cartridge 107 for use even without a direct connection to the data center 106, thus avoiding delays in use on the one hand and preventing unauthorized excessive use on the other. It is preferably provided that the standard consumption SVV corresponds at most to the minimum remaining quantity RMM, preferably is smaller than the minimum remaining quantity RMM. This is a simple and reliable way to avoid a complete emptying of the ink cartridge 107.

It should be noted here that all or some of the memories of the franking machine 102 and the data center 106 described above may be designed both as separate memory modules and as individual memory areas of a single memory module of the franking machine 102 or data center 106.

The present disclosure has been described above using examples with franking machines. It goes without saying, however, that it can be used in conjunction with other franking systems (e.g. so-called PC franking systems) where the individual components are not integrated in a common housing. This disclosure may also be used in conjunction with any other material processing equipment where any consumer good is consumed in a corresponding printer.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, and without departing from the general concept of the present disclosure.

Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. A circuit includes an analog circuit, a digital circuit, state machine logic, data processing circuit, other structural electronic hardware, or a combination thereof. A processor includes a microprocessor, a digital signal processor (DSP), central processor (CPU), application-specific instruction set processor (ASIP), graphics and/or image processor, multi-core processor, or other hardware processor. The processor may be "hard-coded" with instructions to perform corresponding function(s) according to aspects described herein. Alternatively, the processor may access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary embodiments described herein, the memory is any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

The invention claimed is:

1. A system for printing an imprint, comprising:
   a cartridge configured to contain a consumable, the cartridge including a first non-volatile memory that stores a unique cartridge identification of the cartridge; and
   a franking machine including a printer configured to use the cartridge and a first data processor connected to the printer to control the use of the cartridge to produce the imprint, the franking machine being configured to:
      detect insertion of the cartridge into the printer; and
      generate current consumption information representative of the use of the cartridge by the printer since insertion of the cartridge into the printer,
   wherein the first data processor is configured to:
      cause, at least when at least one predeterminable usage-relevant event occurs, a storage of a current use-information generated based on the current consumption information logically linked to the cartridge identification in a second memory, the at least one predeterminable usage-relevant event being relevant to the use of the cartridge by the printer; and
      write to an irreversibly writable memory area of the first non-volatile memory when the at least one predeterminable usage-relevant event occurs.

2. The system according to claim 1, wherein the at least one usage-relevant event is:
   a first use of the cartridge after insertion;
   an occurrence of a predeterminable consumption value since the insertion of the cartridge;
   an occurrence of a predeterminable consumption value since an immediately preceding usage-relevant event; and/or
   receipt of a removal command for removing the cartridge from the printer.

3. The system according to claim 1, wherein:
   the first non-volatile memory comprises a plurality of N irreversibly writable memory areas; and
   the data processor is configured to write to the plurality of N irreversibly memory areas in a predetermined sequence when the at least one predeterminable usage-relevant events occur, wherein:
   the non-volatile first memory includes N=10 to 100 irreversibly writeable memory areas;
   the first non-volatile memory is divided physically and/or logically into a plurality of M memory area groups each having a plurality of irreversibly writable memory areas, the first non-volatile memory having M=2 to 20 memory area groups; and/or
   each irreversibly writable memory area includes exactly one bit.

4. The system according to claim 3, wherein:
   at least some of the irreversibly writable memory areas are physically and/or logically combined to form a memory area group which has at least one first memory area and at least one second memory area, the first data processor being configured to write to the first memory area when a usage-relevant event occurs and to block the cartridge from being used by the printer if all the first memory areas of the memory area group are written to and the at least one of the second memory areas of the memory area group is not written, the first data processor and/or the at least one second memory area being configured such that the at least one second memory area cannot be written by the first data processor;
   at least a first part of the irreversibly writable memory areas are physically and/or logically combined to form a first memory area group and at least a second part of the irreversibly writable memory areas are physically and/or logically combined to form a second memory area group, the respective memory area group comprising at least a first memory area and at least a second memory area, the first data processor being configured to allow further use of the cartridge by the printer when all first and second memory areas of the first memory area group are written to and the second memory area group comprises at least one unwritten first memory area, wherein the first data processor is configured to write to the first memory area of the second memory area group when a usage-relevant event occurs after the first detection of an written-to second memory area of the first memory area group; and/or
   at least a portion of the irreversibly writable memory areas are physically and/or logically combined to form at least one memory area group which has at least one first memory area and at least one second memory area, the memory areas are configured such that a first memory area is writable by the first data processor and a second memory area is unwritable by the first data processor but only by an authorized re-filler of the cartridge.

5. The system according to claim 4, wherein:
   the first data processor is configured to write to one of the irreversibly writable memory areas when the cartridge is initially used after insertion and/or when a predeterminable consumption value is reached; and
   the first data processor is configured to cause storage of a memory area identification of the written-to memory area logically associated with the cartridge identification in the at least one second memory, wherein:
   the first data processor is configured to cause storage of the memory area identification of the written-to memory area logically associated with a unique franking machine identification of the franking machine, and/or
   the first data processor is configured to logically assign consumption quantity information to the written-to memory area which is representative of a consumption quantity of consumable of the cartridge assigned to the written-to memory area, and to enable use of the cartridge depending on the consumption quantity information and a current consumption information until the consumption quantity assigned to the written-to memory area is reached.

6. The system according to claim 1, wherein:
   the second memory is a memory of the franking machine or a data center remote from the franking machine, the data center being connected to the data processor via a communication network, wherein the data processor is configured to transmit the current usage information linked to the cartridge identification and to a unique franking machine identification of the franking machine to the remote data center;
   the current usage information corresponds to the current consumption information or the current usage information is residual quantity information that is representative of a remaining residual quantity of consumable of the cartridge and is determined using the current consumption information; and/or
   the second memory is configured to store a plurality of cartridge data sets, each cartridge data set of the plurality of cartridge data sets comprising at least one usage information and one cartridge identification for a cartridge, the cartridge data set including at least one unique franking machine identification of the franking machine assigned to the usage information and from which current usage information originates.

7. The system according to claim 1, wherein the data processor is configured to:
interrogate, triggered by insertion of the cartridge into the franking machine and using the cartridge identification, stored residual quantity information from a remote data center and associated with the cartridge that is representative of a remaining residual quantity of consumable of the cartridge;
release use of the cartridge depending on the residual quantity information obtained and the current consumption information until a predeterminable minimum residual quantity is reached;
determine, at least when the at least one usage-relevant event occurs, an updated residual quantity information using the received residual quantity information and the current consumption information, and to transmit the updated residual quantity information as the current usage information to the remote data center; and/or
release a use of the cartridge only until a standard consumption is reached after the cartridge has been inserted into the franking machine unless the interrogated residual quantity information is received from the remote data center, the standard consumption being less than a minimum residual quantity.

8. The system according to claim 1, further comprising:
a data center remote from the franking machine and connected to the first data processor via a communication network, the data center including the second memory, wherein the data center and the first data processor are configured to access, using the cartridge identification, the usage information logically associated with the cartridge from the second memory to enable the franking machine to use the cartridge.

9. The system according to claim 1, wherein:
the first non-volatile memory of the cartridge comprises a plurality of irreversibly writable memory areas; and/or
the cartridge comprises a print head that integrally includes the first non-volatile memory.

10. A method for controlling a system for printing an imprint, the system comprising a cartridge configured to hold a consumable and a franking machine that includes a printer configured to use the cartridge and a first data processor connected to the printer that is configured to control use of the cartridge for printing the imprint, the method comprising:
detecting, by the franking machine, an insertion of the cartridge into the printer;
generating, by the franking machine, current consumption information representative of the use of the cartridge by the printer since insertion of the cartridge;
storing a unique cartridge identification of the cartridge in a first non-volatile memory of the cartridge, the stored unique cartridge identification being unchangeable;
initiating, by the first data processor, at least when at least one predeterminable usage-relevant event occurs, a storage of a current use-related information, generated based on the current consumption information logically linked to the unique cartridge identification, in a second memory, the at least one predeterminable usage-relevant event being relevant for use of the cartridge by the printer; and writing, by the first data processor, to an irreversibly writable memory area of the first non-volatile memory when the at least one predeterminable usage-relevant event occurs.

11. The method according to claim 10, wherein the at least one predeterminable usage-relevant event is:
a first use of the cartridge after insertion;
an occurrence of a predeterminable consumption value since the insertion;
an occurrence of a predeterminable consumption value since an immediately preceding usage-relevant event; and/or
receipt of a removal command for removing the cartridge from the printer.

12. The method according to claim 10, wherein:
the first non-volatile memory comprises a plurality of irreversibly writable memory areas; and
the first data processor is configured to write to the plurality of N irreversibly writable memory areas in a predetermined sequence when the at least one predeterminable usage-relevant events occur, wherein:
at least some of the plurality of irreversibly writable memory areas are physically and/or logically combined to form a memory area group having at least one first memory area and at least one second memory area, the first data processor being configured to write to the least one first memory area when a usage-relevant event occurs and to block use of the cartridge by the printer if all the first memory areas of the memory area group are written to and the at least one second memory area of the memory area group is not written to, wherein the at least one second memory area cannot be written to by the first data processor;
at least a first part of the plurality of irreversibly writable memory areas are physically and/or logically combined to form a first memory area group and at least a second part of the plurality of irreversibly writable memory areas are physically and/or logically combined to form a second memory area group, the respective memory area group having at least a first memory area and at least a second memory area, and the first data processor is configured to: allow further use of the cartridge by the printer when all the first and second irreversibly writable memory areas of the first memory area group are written to and the second memory area group has at least one unwritten first memory area, and to write to a first memory area of the second memory area group when a usage-relevant event occurs after a written-to second memory area of the first memory area group has been detected for the first time; and/or
at least some of the plurality of irreversibly writable memory areas are physically and/or logically combined to form at least one memory area group which has at least one first memory area and at least one second memory area, the at least one first memory area being writable to by the first data processor and the at least one second memory area being unwritable to by the first data processor and only writable by an authorized refiller of the cartridge.

13. The method according to claim 12, wherein:
the first data processor is configured to write to one of the plurality of irreversibly writable memory areas when the cartridge is initially used after insertion and/or when a predeterminable consumption value is reached; and
the first data processor is configured to cause a memory area identification of the one of the plurality of irreversibly writable memory areas having been written to to be stored logically associated with the cartridge identification in the second memory, wherein:
the first data processor is configured to cause the memory area identification of the one of the plurality of irreversibly writable memory areas having been written to to be stored logically linked to a unique franking machine identification of the franking machine; and/or
the first data processor is configured to logically assign, to the one of the plurality of irreversibly writable memory areas having been written to, a consumption quantity information representative of a consumption quantity of consumable of the cartridge assigned to the one of the plurality of irreversibly writable memory areas having been written to, and to release use of the cartridge as a function of the consumption quantity information and the current consumption information until the consumption quantity assigned to the one of the plurality of irreversibly writable memory areas having been written to is reached.

14. The method according to claim 10, wherein:
the at least one second memory is a memory of the franking machine or a data center remote from the franking machine, the data center being connected to the first data processor via a communication network, wherein the first data processor is configured to transmit the current usage information linked to the cartridge identification and to a unique franking machine identification of the franking machine to the remote data center;
the current usage information corresponds to the current consumption information or the current usage information is residual quantity information that is representative of a remaining residual quantity of consumable of the cartridge and is determined using the current consumption information; and/or
the second memory is configured to store a plurality of cartridge data sets, each cartridge data set of the plurality of cartridge data sets comprising at least one usage information and one cartridge identification for the cartridge, the cartridge data set including at least one unique franking machine identification of the franking machine assigned to the usage information and from which current usage information originates.

15. The method according to claim 10, wherein the first data processor is configured to:
interrogate, triggered by inserting the cartridge into the franking machine and using the cartridge identification, stored residual amount information from a remote data center and associated with the cartridge that is representative of a remaining residual amount of consumable of the cartridge;
release use of the cartridge depending on the residual quantity information obtained and the current consumption information until a predeterminable minimum residual quantity is reached;
determine, at least when the at least one usage-relevant event occurs, an updated residual quantity information using the received residual quantity information and the current consumption information, and to transmit the updated residual quantity information as the current usage information to the remote data center; and/or
after the cartridge has been inserted into the franking machine, release use of the cartridge only until a standard consumption has been reached unless the retrieved stored residual quantity information is received from the remote data center, the standard consumption being smaller than the minimum residual quantity.

16. The method according to claim 10, further comprising:
a data center remote from the franking machine and connected to the first data processor via a communication network, the data center including the second memory, wherein the data center and the first data processor are configured to access, using the cartridge identification, the usage information logically associated with the cartridge from the second memory to enable the franking machine to use the cartridge.

17. A non-transitory computer-readable storage medium with an executable program stored thereon, wherein, when executed, the program instructs a processor to perform a method for controlling a system for printing an imprint, the system including a cartridge configured to hold a consumable and a franking machine that includes a printer configured to use the cartridge and a first data processor connected to the printer that is configured to control use of the cartridge for printing the imprint, the method comprising:
detecting, by the franking machine, an insertion of the cartridge into the printer;
generating, by the franking machine, current consumption information representative of the use of the cartridge by the printer since insertion of the cartridge:
storing a unique cartridge identification of the cartridge in a first non-volatile memory of the cartridge, the stored unique cartridge identification being unchangeable;
initiating, by the first data processor, at least when at least one predeterminable usage-relevant event occurs, a storage of a current use-related information, generated based on the current consumption information logically linked to the unique cartridge identification, in a second memory, the at least one predeterminable usage-relevant event being relevant for use of the cartridge by the printer; and
writing, by the first data processor, to an irreversibly writable memory area of the first non-volatile memory when the at least one predeterminable usage-relevant event occurs.

* * * * *